United States Patent
Cormack

(10) Patent No.: US 6,781,757 B2
(45) Date of Patent: Aug. 24, 2004

(54) POLARIZATION INSENSITIVE TUNABLE OPTICAL FILTERS

(75) Inventor: Robert H. Cormack, Boulder, CO (US)

(73) Assignee: Micron Optics, Inc., Atlanta, GA (US)

( * ) Notice: Subject to any disclaimer, the term of this patent is extended or adjusted under 35 U.S.C. 154(b) by 0 days.

(21) Appl. No.: 10/126,731

(22) Filed: Apr. 19, 2002

(65) Prior Publication Data

US 2002/0171935 A1 Nov. 21, 2002

Related U.S. Application Data

(60) Provisional application No. 60/285,221, filed on Apr. 20, 2001.

(51) Int. Cl.⁷ .......................... G02B 5/28; G02B 27/10; G02B 27/28
(52) U.S. Cl. ...................... 359/578; 359/494; 359/502; 359/900
(58) Field of Search ................................ 359/577, 278, 359/579, 502, 900, 578; 398/83, 85

(56) References Cited

U.S. PATENT DOCUMENTS

| | | |
|---|---|---|
| 4,373,782 A | 2/1983 | Thelen |
| 4,756,602 A | 7/1988 | Southwell et al. |
| 4,813,756 A | 3/1989 | Frenkel et al. |
| 4,919,503 A | 4/1990 | Mroynski |
| 5,193,027 A | 3/1993 | Preston ....................... 359/566 |
| 5,481,402 A | 1/1996 | Cheng et al. ............... 359/498 |
| 5,504,608 A | 4/1996 | Neeves et al. |
| 5,719,989 A | 2/1998 | Cushing ....................... 359/580 |
| 5,777,793 A | 7/1998 | Little et al. .................. 359/584 |
| 5,812,291 A | 9/1998 | Bendelli et al. |
| 5,822,095 A | 10/1998 | Taga et al. |
| 5,917,626 A | 6/1999 | Lee |
| 5,926,317 A | 7/1999 | Cushing ....................... 359/588 |
| 5,949,801 A | 9/1999 | Tayebati ....................... 372/20 |
| 5,999,322 A | 12/1999 | Cushing ...................... 359/589 |
| 6,011,652 A | 1/2000 | Cushing ...................... 359/589 |
| 6,018,421 A | 1/2000 | Cushing ...................... 359/588 |
| 6,040,944 A | 3/2000 | Pan et al. ................... 359/590 |
| 6,075,647 A | 6/2000 | Braun et al. ................ 359/578 |
| 6,088,166 A | 7/2000 | Lee ............................. 359/654 |
| 6,122,301 A | 9/2000 | Tei et al. ....................... 372/32 |
| 6,246,818 B1 * | 6/2001 | Fukushima .................. 385/47 |
| 6,292,299 B1 | 9/2001 | Liou ........................... 359/583 |
| 6,320,996 B1 | 11/2001 | Scobey et al. ................ 385/18 |
| 6,370,285 B1 * | 4/2002 | Naganuma ................... 385/11 |
| 6,522,467 B1 * | 2/2003 | Li et al. ....................... 359/484 |
| 2003/0007225 A1 * | 1/2003 | Hsieh et al. ................ 359/193 |

FOREIGN PATENT DOCUMENTS

| | | |
|---|---|---|
| CA | 2270768 | 11/1999 |
| EP | 0887964 | 12/1998 |
| EP | 0903616 | 3/1999 |
| JP | 57016404 | 1/1982 |
| JP | 09-146020 A * | 6/1997 |
| JP | 10324037 | 5/2000 |

OTHER PUBLICATIONS

PCT Application entitled, "RUGGEDIZED BYPASS SWITCH," by Raychem, Publication No.: WO 92/20002, Publication date: Nov. 1992, Application No.: PCT/US92/03461, Application date: Apr.–1992.

(List continued on next page.)

*Primary Examiner*—John Juba, Jr.
(74) *Attorney, Agent, or Firm*—Jennifer L. Bales; Macheledt Bales & Heidmiller LLP

(57) ABSTRACT

A polarization insensitive tunable optical filter system combines an interference filter or the like with a quarter wave plate and a retro-reflector. The retro-reflector is situated and aligned to intercept light reflected from the filter, and the quarter wave plate is disposed between the filter and the retro-reflector. Hence, the pass signal reflected off the filter a first time passes through the quarter wave plate a first time, reflects off of the retro-reflector, passes through the quarter wave plate a second time, and reflects off of the filter a second time.

18 Claims, 3 Drawing Sheets

OTHER PUBLICATIONS

PCT Application entitled "WAVELENGTH SELECTIVE OPTICAL SWITCH," by Scobey, Publication No.: WO 00/39626, Publication date Jul.–2000, Application No.: PCT/Us99/31021, Application date: Dec.–1999.

PCT Application entitled, "Dynamically Configurable Spectral Filter," by Brophy et al. On behalf of Corning Incorporated, publication No.: WO 01/04674 A1, Publication Date: Jan.–2001, Application No.: PCT/US00/1388, Application Date May–2000.

PCT Application entitled, "SEG,EMTED Thin Film Add/Drop Switch and Multiplexer," by Boisset et al. On behalf of Corning Incorporated, Publication No.: WO 01/57570 A1, Publication date: Aug.–2001, Application No.: PCT/US01/03871, Application Date: Jun.–2001.

Haschberger et al., "Michelson Interferometer with a rotating retroreflector" Applied Optics vol. 29: No. 28: (Oct. 1, 1990, p. 4216).

Patel et al. "Tunable Polarization Diversity Liquid–Crystal Wavelength Filter" Photonics Technology Letters vol. 3 (8), pp. 739–740, Aug. 1991.

* cited by examiner

Figure 3
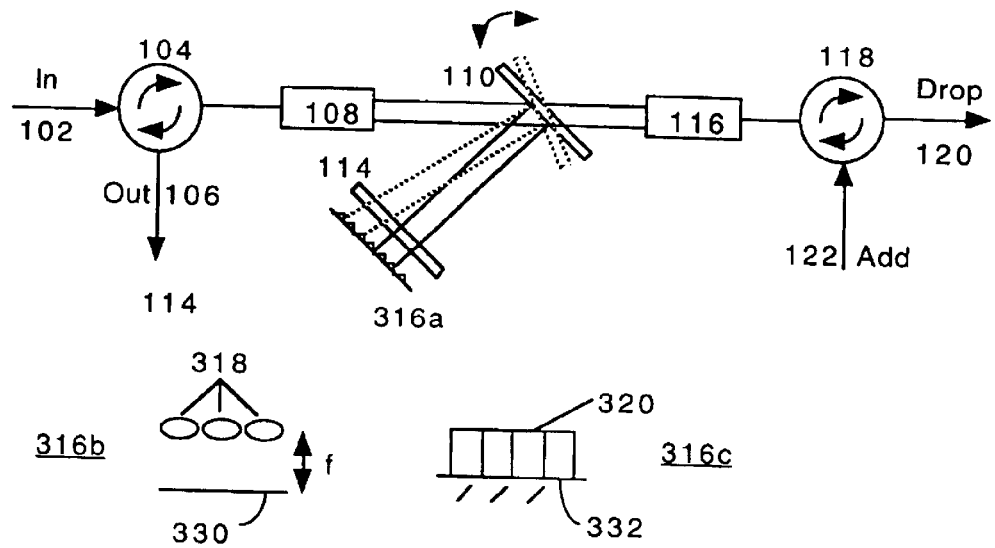
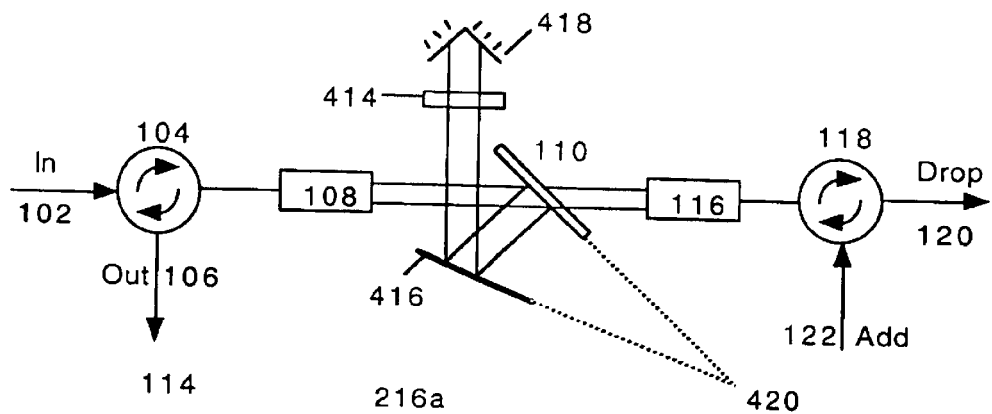
Figure 4

POLARIZATION INSENSITIVE TUNABLE OPTICAL FILTERS

U.S. Pat. No. 6,362,904, issued Mar. 26, 2002 and U.S. patent application Ser. No. 09/844,797, filed Apr. 27, 2001 are incorporated herein by reference.

BACKGROUND OF THE INVENTION

This application Claims benefit of U.S. Provisional Patent Application No. 60/285,221, filed Apr. 20, 2001

1. Field of the Invention

The present invention relates to polarization insensitive tunable optical filters having retained complementary outputs.

2. Description of the Prior Art

Optical fiber wavelength division multiplexed (WDM) communications systems are theoretically capable of extremely high data rates (terabits per second), meaning that many channels of gigabit rate data can theoretically be carried on a fiber, via wavelengt h division multiplexing.

Currently the two methods of constructing nodes on a fiber network are Optical to Electronic to Optical (OEO) conversion and fixed optical add/drop filters. OEO is the most common method, but is very expensive. The signals which are not being dropped are used to modulate lasers and the resulting wavelengths are multiplexed back in. Much of the hardware is data rate dependant.

Fixed optical add/drop nodes are simpler and less expensive, but must be replaced when any change is made. In addition, certain paths through the network are blocked from use, as no single wavelength can connect them. If the network is manually configured to remove a given block, another blocked path is inevitably created. This problem grows rapidly with increasing network complexity.

The utility of fiber optic systems has been limited because a truly useful optical tunable add/drop filter requires five characteristics:

1) Flat-topped pass bands, so that the modulation sidebands of the signal (where all of the information resides) are not attenuated;

2) Accurate tunability;

3) Retaining of the complementary output so the filter can add and/or drop, and those signals which do not emerge from one of the outputs will emerge from the other;

4) Hitless tuning, so that the filter is able to switch from dropping or adding any channel to any other channel without interference to other channels; and 5) Polarization insensitivity, so that the filter does not have differing bandpasses or optical path lengths for inputs of differing polarizations.

Currently, optical add/drop filters lacking at least one of the above characteristics are used to extract desired frequencies. Most tunable filter technologies, such as acousto-optic filters and Fabre-Perot filters cannot be constructed with flat-topped pass bands.

Interference filters are a relatively inexpensive, mature technology, and produce a flat bandpass. It is common to get flat-topped pass-bands and channel spacings down to 100 GHz (0.8 nm, in the 1550 nm communications band). Interestingly, interference filters can theoretically be tuned across a significant bandwidth by changing the angle of incidence of the light striking the filter. The limitation formerly preventing interference filter systems from being both tuned (rotated) and used as add/drop filter was the great difficulty of tracking the reflected output) as the filter was rotated. U.S. Pat. No. 6,362,904 by the present inventor (incorporated herein by reference) illustrates configurations which overcome this limitation. However, these configurations generally require a polarized signal or external circuitry to render the filter embodiments polarization insensitive.

A need remains in the art for tunable optical filters which retain the complementary output, have flat topped pass bands, and are polarization insensitive.

SUMMARY OF THE INVENTION

An object of the invention is to provide tunable optical filters which retain the complementary output, have flat topped pass bands, and are polarization insensitive.

A polarization independent tunable optical filter system according to the present invention includes a filter of the type which reflects a pass signal and transmits a drop signal according to frequency, tunable by rotation with respect to the input beam, and a retro reflector assembly situated and aligned to intercept light reflected from the filter. The retro reflector assembly includes a quarter wave plate, and a retro reflector element. The pass signal reflected off the filter a first time passes through the quarter wave plate a first time, reflects off of the retro reflector element, passes through the quarter wave plate a second time, and reflects off of the filter a second time.

In general, the filter is an interference filter. Preferably, the system includes a null state/all-pass element. In this case, the filter has a mirror portion adjacent to a filtering portion. The lens is a cylindrical lens whose axis is parallel to the the direction from the mirror portion to the filtering portion. A beam displacer selectively redirects the input beam toward the mirror portion or the filtering portion.

The retro reflector element might be a lens located one focal length from the filter and a mirror located one focal length from the lens. Or, the retro-reflector element could be an array of retro-reflector devices (such as corner cubes or cat's eye lenses). Another retro-reflector element configuration is a first mirror affixed adjacent to the filter, wherein the fixed angle formed by the plane of the filter and the plane of the first mirror is under 180°, so that the the mirror and the filter forming a reflector assembly. The input beam is directed such that the portion of the input beam that reflects off of the interference filter also reflects off of the mirror. The reflector assembly is rotated about an axis at the vertex of the the plane of the filter and the plane of the mirror to tune the filter. A second mirror is aligned to intercept the reflected light from the first mirror, and the quarter wave plate is located between the first mirror and the second mirror. In the reflector assembly configuration, the angle formed by the plane of the filter and the plane of the first mirror might be approximately 45°.

A circulator between the input beam and the filter can provide the input beam to the filter, and also provide light reflected from the filter the second time as a pass signal. Another circulator between the filter and the drop signal can provide the input light transmitted through the filter as a drop signal and can provide an add signal to the filter for combination with the pass signal.

Alternatively, a two fiber connector between the input beam and the filter may provide the input beam along a first path to the filter, and collect light reflected from the filter the second time as a pass signal along a second path. In this case, a second connector between the filter and the drop signal collects light passed through the filter along a first path and for provides an add signal to the filter along a second path.

BRIEF DESCRIPTION OF THE DRAWINGS

FIG. 3 shows a block diagram of a third embodiment of an improved optical filter system according to the present invention, not requiring a lens.

FIG. 4 shows block diagram of a fourth embodiment of an improved optical filter system according to the present invention, using a reflector assembly

DETAILED DESCRIPTION OF THE PREFERRED EMBODIMENTS

The present invention teaches polarization insensitive optical add and/or drop filter devices for obtaining complementary outputs from a tunable (by rotation) interference filter or the like, optionally in configurations with a switchable null state (all wavelength pass) so that the filter system can tune between non-adjacent wavelengths without interrupting the wavelengths in between, in configurations which don't require the use of lenses within the device, or in configurations which don't require circulators to accomplish adding or dropping signals.

Figure 1:
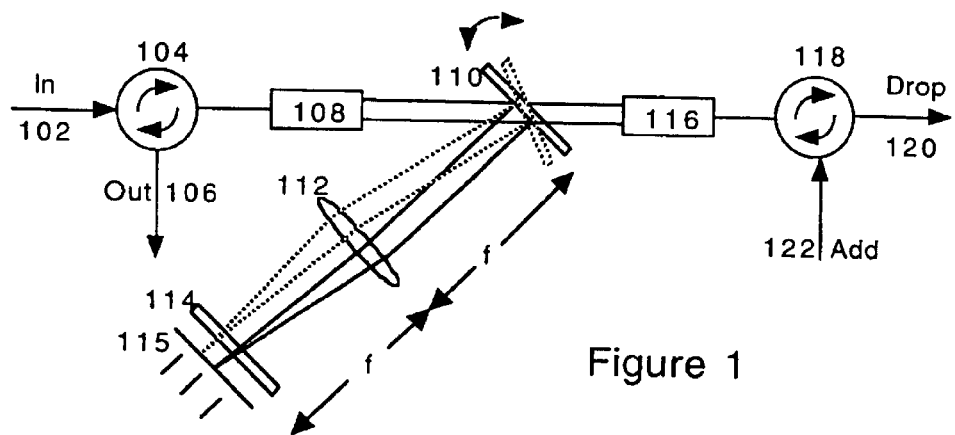
FIG. 1 shows a block diagram of a first embodiment of an improved optical filter system according to the present invention.

FIG. 1 shows a block diagram of a first embodiment of an improved optical filter system according to the present invention, including circulators 104, 118, collimators 108 and 116, interference filter 110, and retroreflection assembly 112, 114, 115. Circulator 104 has as its input signal 102 comprising all of the channels provided as input to the filter system. It provides output signal 106, comprising the input signal minus the drop signal 120 and plus the add signal 122.

Circulator 118 operates to add signal 122 and to drop signal 120. Signals coming into a circulator from the right (such as signal 102 into circulator 104) are passed straight through, signals coming into circulator from the left are routed downward, and signals coming upward into the circulator (such as add signal 122 into circulator 118) are routed to the left.

Thin film interference filter 110 is tuned by changing the angle of incidence of the light striking the filter, i.e. by rotation with respect to the incident beam. Hence, depending upon its position, filter 110 allows a selected channel to pass through it, to be dropped at 120 and/or added at 122.

Retro-reflection assembly 112, 114, 115 provides the polarization insensitivity aspect of the filter device. Lens 112 is situated one focal length from filter 110 and one focal length form mirror 115. Quarter wave plate 114 is between filter 110 and mirror 115. Hence, any input channels which do not pass through filter 110 (but rather reflect off of it) do pass through quarter wave plate 114 twice.

Light reflected from the filter is focused into a telecentric cone by lens 112 onto mirror 115. The light reflected from mirror 115 exactly retraces this cone, and lens 115 produces a beam which exactly retraces the input beam. Quarter wave plate 114 situated between lens 112 and mirror 115 has its optic axis at 4° to the S and P polarization direction (with respect to light reflecting from the filter). Thus, these two polarizations are exchanged after two passes through the quarter wave plate. The light that was polarized in the S direction at its first reflection off filter 110 is now polarized in the P direction at its second reflection off filter 110, and vice versa. This causes the effective bandpass function for the doubly reflected light to be the product of the S and P polarization band passes of the thin film filter—and removes the polarization sensitivity of the filter device. All of the embodiments below also incorporate the concept of light reflecting off of filter 110 twice, and passing through a quarter wave plate twice in between, in oder to make the devices polarization insensitive.

Figure 2:
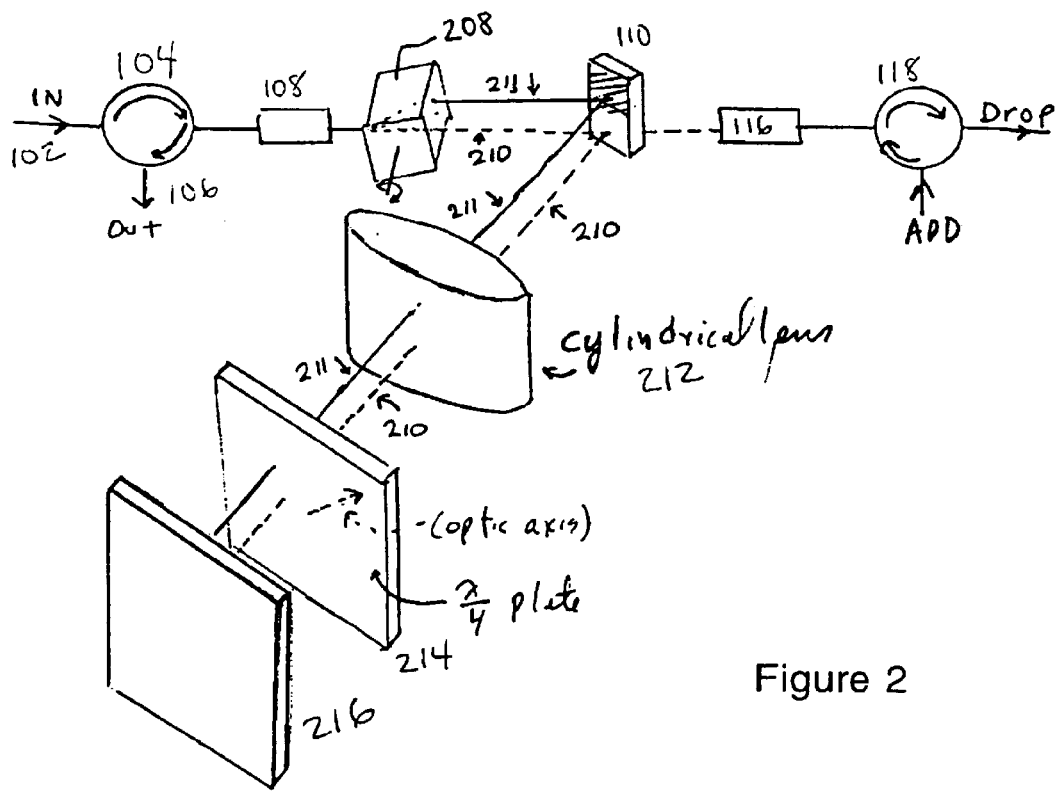
FIG. 2 shows a perspective diagram of a second embodiment of an improved optical filter system according to the present invention, with hitless tuning.

FIG. 2 shows a perspective diagram of a second embodiment of an improved optical filter system according to the present invention, with hitless tuning. This embodiment is very similar to that shown in FIG. 1, and s similar reference numbers indicate similar elements. Hitless tuning is described extensively in U.S. patent application Ser. No. 091844,797, incorporated herein by reference. Briefly, the additions are as follows.

Filter 110 is modified such that the top ½ of its surface forms a mirror. Parallel-plate beam displacer (or beam translation block) 208 is placed before filter 110, in order to deflect the input beam unto either the mirrored portion of filter 110 or onto the filtering portion of filter 110. In dotted lines, parallel-plate beam displacer 208 is in its unrotated position. Input beam 102 thus passes through (or is reflected by) the filtering half of filter 110 in the normal manner. In solid lines, parallel-plate beam displacer 208 is in its rotated position. Thus, input beam 102 is parallel-displaced so as to intercept the mirrored surface of filter 110. All of the wavelengths in the fiber are reflected through retro-reflection assembly 212, 214, 216 and back so that the filter has no effect. No wavelengths are dropped; all are passed.

Note that if mirror 216 were tilted slightly, the return reflection would be displaced slightly and could be coupled to a different collimator (eliminating the need for an input circulator).

FIG. 3 shows a block diagram of a third embodiment of an improved optical filter system according to the present invention, not requiring a lens. This embodiment is very similar to that of FIG. 1, except that retro-reflection assembly 112, 114, 115 has been replaced with retro-reflection assembly 114, 316. No lens is required in this embodiment. A variety of elements may be used for the retro-reflector array 316. For example, Retro-reflector array 316a comprises an array of small corner cubes (or an array of small dihedrals). Retro-reflector array 316b comprises an array of cat's eye retro-reflectors, where lenses 318 are placed one focal length in front of mirror 330. Retro-reflector array 316c comprises an array of GRIN lenses in front of mirror 332. An array of micro lenses or an array of micro cylindrical lenses could also be used, as well as other suitable retro-reflector means.

FIG. 4 shows block diagram of a fourth embodiment of an improved optical filter system according to the present invention, using a reflection assembly 110, 416 as the retro-reflector. Interference filter 110 is combined with a mirror 416 at an angle to filter 110 so as to form a reflector assembly. Note that filter 110 and mirror 416 can be oriented at any angle under 180°, so long as the input beam can reflect off of the filter and the reflected portion then reflects off of the mirror. In the embodiment of FIG. 4, filter 110 and mirror 416 form a 45° angle. Note that filter 110 and mirror 416 do not need to be joined at the apex of their extended planes, so long as they rotate around an axis 420 located there. The operation of such a reflector assembly is described in detail in U.S. Pat. No. 6,362,904. Briefly, the reflector assembly causes the reflected input beam to maintain the same position as the reflector assembly is turned.

Hence, the light reflected from filter 110 and mirror 416 will always follow the same path through quarter wave plate 414 twice and reflecting off of mirror 418. In the embodiment of FIG. 4, mirror 418 comprises two mirrors set at an angle, so that alignment of mirror 418 is not essential. This is optional, however.

Figure 5:
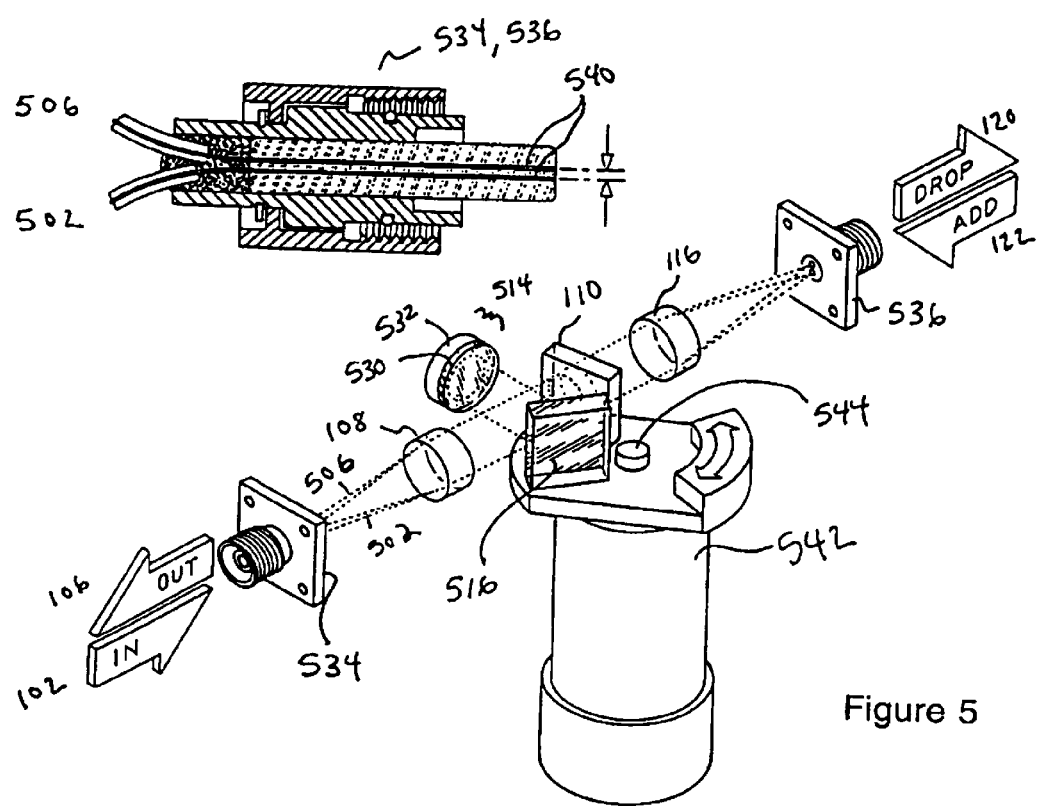
FIG. 5 shows a perspective diagram of a fifth embodiment of an improved optical filter system according to the present invention, not requiring circulators.

FIG. 5 shows a perspective diagram of a fifth embodiment of an improved optical filter system according to the present invention, not requiring circulators. This embodiment is very similar to that of FIG. 4. The differences are as follows. Coupler 534 comprises a two fiber 540 interface, which directs the input 102 along path 502 and receives the output 106 along path 506.

Filter 110 and mirror 516 form a reflector assembly like that described in conjunction with FIG. 4. Turntable 542 shown in this Figure rotates reflector assembly 110, 516 about vertex 544 located at the projected intersection of filter 110 and mirror 516. Some such mechanism is also is required in FIG. 4, but is not shown there.

Element 514 comprises a quarter wave plate 530 and a mirror 532. Hence, light passes through quarter wave plate 530 twice as in the other embodiments.

Input light 102 enters lower fiber 540 of connector 534, travels along path 502, and hits filter 110. Input light 102 which reflects off of filter 110 then reflects off of mirror 516 and mirror 532 before reflecting off filter 110 again, entering upper fiber 540, and becoming the pass signal portion of output signal 106. Preferably, mirror 532 is tilted so as to cause the reflected signal to enter upper fiber 540. Input light 502 which is transmitted through filter 110 enters upper fiber 540 of connector 536 and becomes drop signal 120. Add signal 122 (if used) is emitted from upper fiber 540 of connector 536, is transmitted through filter 110, and enters upper fiber 540 of connector 532 to comprise part of output signal 106. While the exemplary preferred embodiments of the present invention are described herein with particularity, those skilled in the art will appreciate various changes, additions, and applications other than those specifically mentioned, which are within the spirit of this invention. Those skilled in the art will appreciate that the embodiments shown and described herein are examples designed to illustrate the invention. These embodiments may be combined in various ways within the spirit of this invention. Further, other null state switches from U.S. patent application Ser. No. 09/844,797 may be used in addition to the one illustrated in FIG. 2. Other add and/or drop filter configurations, such as those taught in U.S. Pat. No. 6,362,904 may also be used within the spirit of this invention.

What is claimed is:

1. A polarization independent tunable optical filter system comprising:
    a filter of the type which reflects a pass signal and transmits a drop signal according to frequency, mounted for rotation with respect to the input beam such that the angle of incidence of the input beam varies as the filter is rotated through a variety of tuning orientations; and
    a retro reflector assembly situated and aligned to intercept light reflected from the filter, the retro reflector assembly including:
        a quarter wave plate, and
        a retro reflector element,
    wherein the pass signal reflected off the filter a first time passes through the quarter wave plate a first time, reflects off of the retro reflector, and retraces its path to pass through the quarter wave plate a second time, and reflect off of the filter a second time regardless of the filter tuning orientation.

2. The apparatus of claim 1 wherein the filter is an interference filter.

3. The apparatus of claim 1, further including a null state/all-pass element wherein:
    the filter further comprises a mirror portion adjacent to a filtering portion and;
    wherein the retro reflector element includes a cylindrical lens whose axis is parallel to the direction from the mirror portion to the filtering portion; and
    further comprising a beam displacer for selectively redirecting the input beam toward the mirror portion or the filtering portion.

4. The filter system of claim 1, wherein the retro reflector element comprises:
    a lens located one focal length from the filter; and
    a mirror located one focal length from the lens.

5. The filter system of claim 1, wherein the retro reflector element comprises an array of retro reflector elements.

6. The filter system of claim 1, wherein the retro reflector element comprises:
    a first mirror affixed adjacent to the filter, wherein the fixed angle formed by the plane of the filter and the plane of the first mirror is under 180°, the mirror and the filter forming a reflector assembly;
    means for directing the input beam such that the portion of the input beam that reflects off of the filter reflects off of the mirror; and
    means for rotating the reflector assembly about an axis at the vertex of the plane of the filter and the plane of the mirror; and
    a second mirror aligned to intercept the reflected light from the first mirror;
    wherein the quarter wave plate is located between the first mirror and the second mirror.

7. The apparatus of claim 6, wherein the angle formed by the plane of the filter and the plane of the first mirror is approximately 45°.

8. The filter system of claim 1, further comprising:
    a circulator between the input beam and the filter for providing the input beam to the filter, and for providing light reflected from the filter the second time as a pass signal.

9. The filter system of claim 8, further including a circulator between the filter and the drop signal for providing the input light transmitted through the filter as a drop signal and for providing an add signal to the filter for combination with the pass signal.

10. The filter system of claim 1, further including:
    a connector between the input beam and the filter for providing the input beam along a first path to the filter, and for collecting light reflected from the filter the second time as a pass signal along a second path.

11. The filter system of claim 10, further including:
    a connector between the filter and the drop signal for collecting light passed through the filter along a first path and for providing an add signal to the filter along a second path.

12. A polarization independent tunable optical filter system comprising:
    filter means of the type which is tunable by rotation with respect to an input beam into one of a plurality of filtering orientations for reflecting a pass signal and transmitting a drop signal according to frequency; and retro-reflector means situated and aligned to intercept and reflect light reflected from the filter means, the retro-reflector means including:

means for rotating the polarization of light by 90°, and means for reflecting light back to the filter means, wherein the pass signal reflected off the filter means a first time reflects from the retro-reflector means and retraces its path to reflect off of the filter means a second time, regardless of the filtering orientation.

13. The filter system of claim 12, further comprising:

means between the input beam and the filter for providing the input beam to the filter means, and for providing light reflected from the filter means the second time as a pass signal.

14. The filter system of claim 13, further including means between the filter and the drop signal for providing the input light transmitted through the filter as a drop signal and for providing an add signal to the filter for combination with the pass signal.

15. The filter system of claim 13, wherein the means for rotating comprises a quarter wave plate through which the light passes twice.

16. The apparatus of claim 13, further including a null state/all-pass switch for either reflecting all input light or for allowing input light to hit the filter means.

17. The method for tunably filtering unpolarized light comprising the steps of:

positioning a filter of the type which reflects a pass signal and transmits a drop signal according to frequency and is tunable by rotation with respect to the input beam into one of a plurality of filtering orientations;

reflecting a pass signal off of the filter and transmitting a drop signal through the filter according to frequency;

rotating the polarization of the reflected pass signal by 90°;

guiding the rotated signal to retrace its path to intercept the filter a second time regardless of the filtering orientation of the filter;

reflecting the rotated signal off of the filter a second time; and providing the rotated and twice reflected signal as a pass output signal.

18. The method of claim 17, further including the step of providing an add signal to the filter for combination with the pass signal.

* * * * *